United States Patent [19]

Mathews

[11] 4,292,789
[45] Oct. 6, 1981

[54] SPRING WIRE BLADES FOR DRUM TYPE MOWERS

[76] Inventor: Bernard C. Mathews, 8606 Rte. 176, Crystal Lake, Ill. 60014

[21] Appl. No.: 140,617

[22] Filed: Apr. 15, 1980

[51] Int. Cl.³ .......................................... A01D 35/264
[52] U.S. Cl. .................................... 56/12.7; 56/13.6; 56/295
[58] Field of Search .................. 56/13.6, 12.7, 295, 56/192, DIG. 4

[56] References Cited

FOREIGN PATENT DOCUMENTS 2422651 12/1974 Fed. Rep. of Germany ........ 56/295
2444610  4/1975 Fed. Rep. of Germany ........ 56/295

*Primary Examiner*—Jay N. Eskovitz
*Attorney, Agent, or Firm*—Kenneth T. Snow

[57] ABSTRACT

"L" shaped spring wire blades for use on drum type mowers. The upper ends of the vertical leg portions of the L-shaped members are fastened to the drum near its upper end and arcuately spaced apart around its cylindrical surface. The vertical portion of each blade projects downwardly at a position closely adjacent the outer cylindrical surface of the drum and passes through an opening in the disc at the base of the drum whereafter the horizontal portion of each blade extends radially outwardly beneath the disc. A hay cutting end of each blade projects radially outwardly beyond the disc to effect cutting of hay as the drum and its unitary disc rotate. The spring wire blade can yield rearwardly about its vertical leg as an axis of torsional twist when its horizontal leg strikes an obstruction. The inherent spring nature of the L-shaped blade will cause it to automatically resume its cutting position when the obstruction is cleared. The mower preferably uses drums in pairs which rotate inwardly toward each other to effect more efficient cutting and to simultaneously windrow the cut hay. Paddle elements are affixed to the outer cylindrical surface of the drum at positions closely in front of the vertical leg of each L-shaped wire blade to aid in the delivery of the harvested hay rearwardly in a windrow and to prevent any cut hay from wedging between the wire blade and the outer surface of the drum.

11 Claims, 4 Drawing Figures

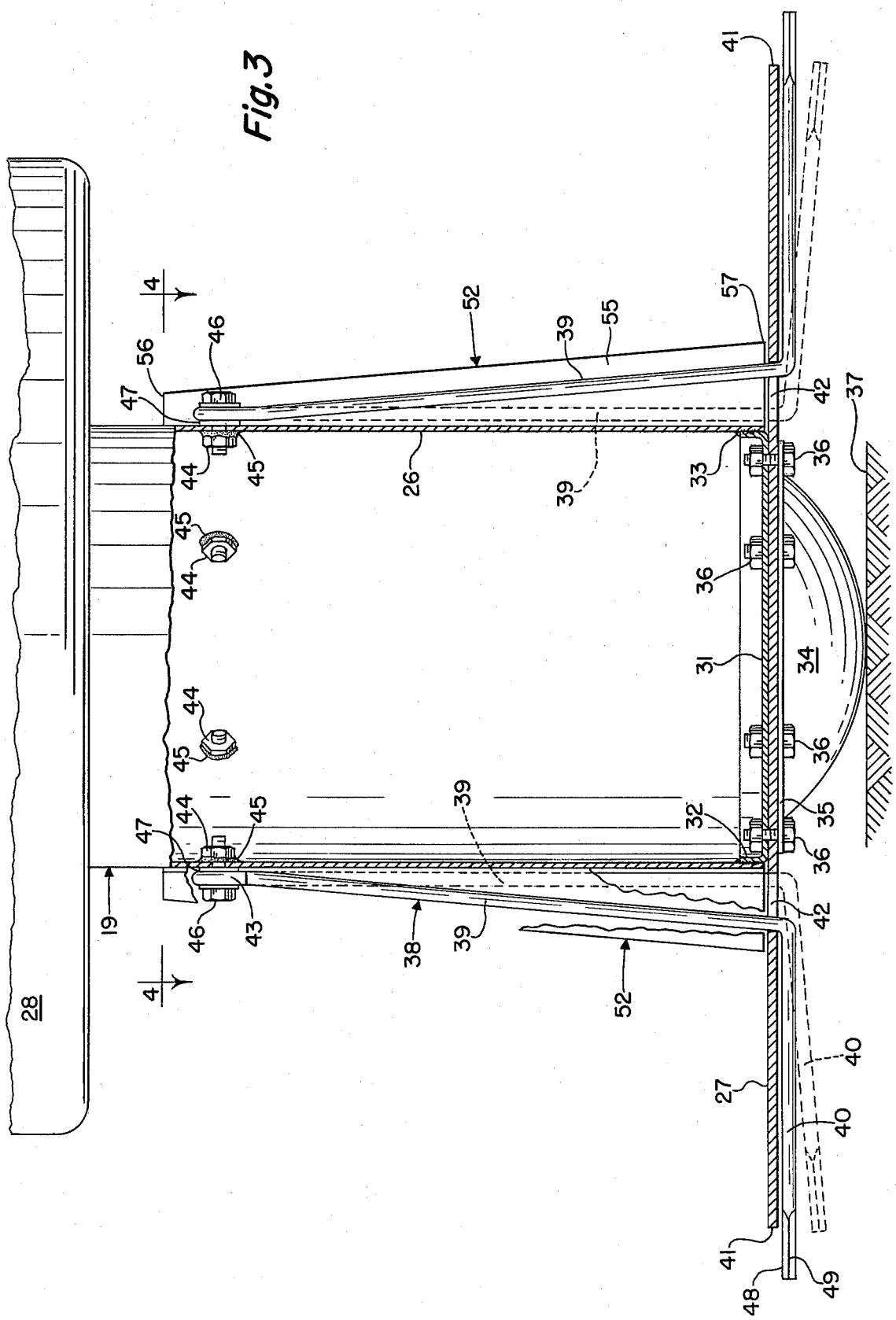

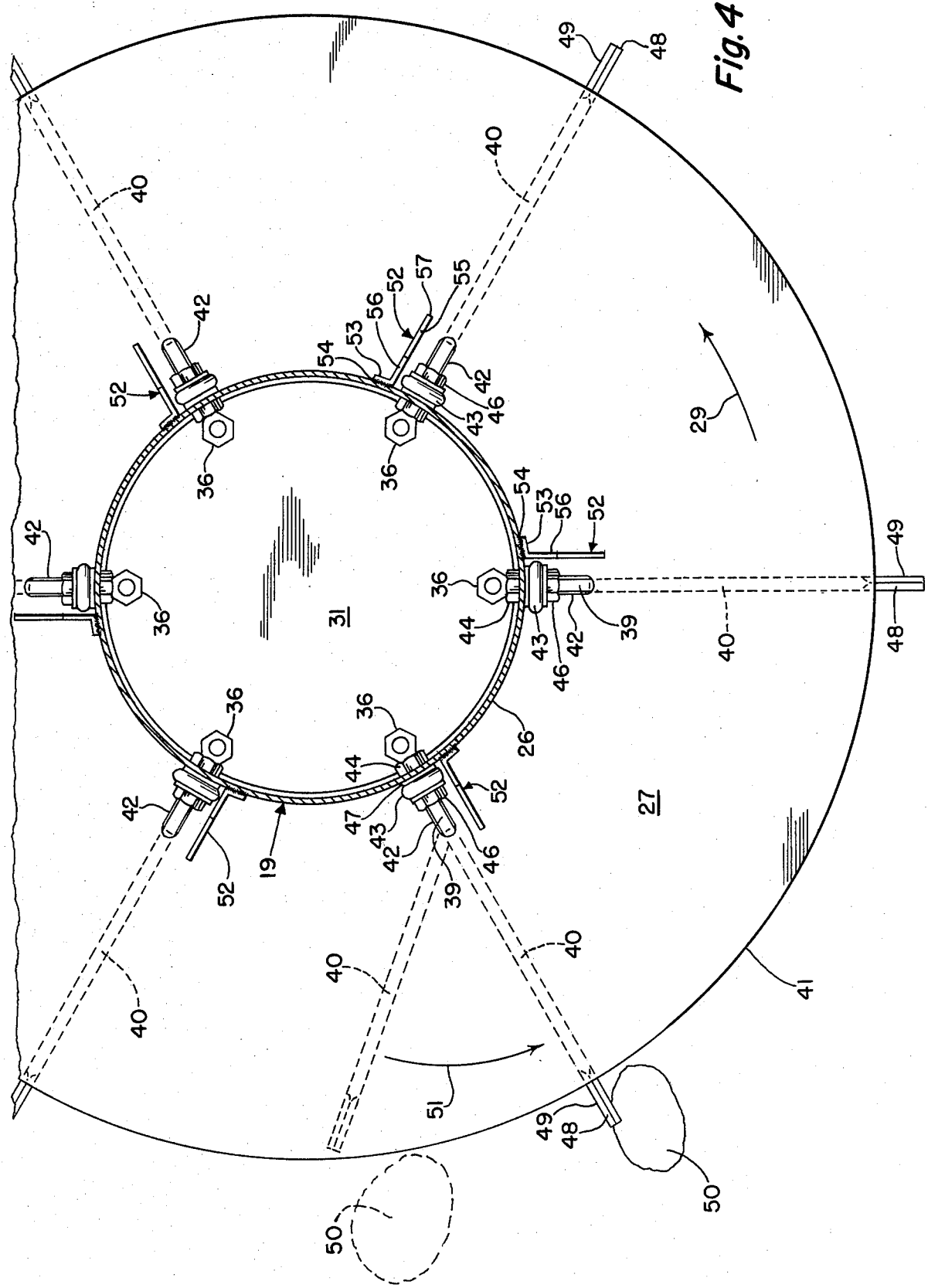

SPRING WIRE BLADES FOR DRUM TYPE MOWERS

BACKGROUND OF THE INVENTION

1. Field of the Invention

Drum type mowers as exemplified in the prior U.S. Pat. No. 3,391,522 to Zweegers are very popular for cutting hay because they provide effective cutting and simultaneous windrowing of the cut hay without substantial auxiliary mechanisms. Such drum mowers are so identified because they employ a vertically disposed cylindrical member which resembles a drum. The bottom of the drum is equipped with a relatively large diameter collar or disc. It is customary to have a plurality of hay cutting blades radially projecting at arcuately spaced apart positions from beneath the large diameter disc. The blades rotate concurrently with the unitary drum and disc to effect hay harvesting. The drums, or rotors as they are often referred to, are used in pairs which are arranged to rotate inwardly toward each other. As the hay is cut it falls on the enlarged discs and is delivered rearwardly of the mower in the confined space between the cooperative pair of drums.

The present invention is concerned with the blades used in drum mowers and more particularly with blades which may yield upon the striking of an obstruction without being damaged and which will automatically resume their cutting positions when the obstruction is passed.

2. Description of the Prior Art

A patent search was conducted and the following U.S. Pat. Nos. were believed to be pertinent to the patentability of the device of this invention.

Walker—2,707,859
Klein, Jr.—2,762,188
Wenzel et al—3,190,064
Dunlap et al—3,208,209
Wixson—3,303,637
Zweegers—3,389,539
Zweegers—3,391,522
Zweegers—3,443,369
Huff et al—3,444,674
Van Der Lely—3,550,360
Geist et al—3,708,967
Kasberger—3,735,572
Moss et al—4,058,959
Inada—4,086,700
Ballas et al—4,112,653
Fisher et al—4,126,990
Mathews—4,160,356
Owens—4,170,099

The three patents to Zweegers and the patents to Van Der Lely, Kasberger, and Mathews (applicant's own prior patent) all depict drum type mowers with radially projecting cutting blades.

The patents to Walker, Klein, Jr., Dunlap et al, Wixson, Moss et al, Inada and Owens all disclose the use of flexible spring wire as mower cutting blades. Owens states his mowing flails could be made of wire cables or Nylon filaments. The Klein, Jr. grass cutting wire is held tautly at both ends when operating. Dunlap shows a variety of embodiments of wire blades. Wixson employs a flexible spring wire as the cutting blade on a rotary mower in which the wire is used in a loop form with both ends attached to a rotating disc. Moss et al shows a mower blade formed of spring wire and arranged in a special loop with two abutting ends acting as the radially extending grass cutting blade and having an auxiliary wire blade abutting the two ends but attached to the rotating member at a spaced apart position. The patent to Inada shows a mower cutting head in which flexible wire members are used as the cutters.

The Geist patented mower employs non-metallic lines as the grass cutting elements. Huff et al discloses a fence cleaner using flails of fan belt material. Ballas et al shows a mower using a plurality of flexible non-metallic cords projecting radially outwardly from a disc to effect grass cutting. Fisher employs Nylon pins to effect grass cutting. Wenzel et al shows a mower having hinged flail cutting blades which are not made of wire.

It is apparent from the above brief synopses of the prior art patents that the use of flexible spring wires as mower cutting blades is quite old. However, applicant's spring wire blades are relatively rigid and could not be described as flexible in the manner of the flexible blades of the prior art described above. It is applicant's use of "L" shaped spring wire blades with each such blade having a fixed attachment only at the upper end of the vertical leg of the blade to the rotating drum element that applicant contends is new and patentable. The vertical leg acts as a torsional spring about which the blade can yield when striking an immovable obstruction. There is nothing in the prior art patents to suggest applicant's employment of an L-shaped spring wire blade operating in a drum type mower as set forth herein.

SUMMARY OF THE INVENTION

A principal object of the present invention is to provide a novel spring wire blade for a drum type mower.

An important object of this invention is to provide a novel blade for a drum type mower in which the blade may yield and fall back from a cutting position to a non-cutting position when it strikes an obstruction and yet will automatically return to its cutting position when the obstruction is passed.

Another important object of this invention is to provide a novel spring wire blade for a drum type mower which can safely strike an obstruction without damaging the blade.

Still another important object of this invention is to provide a novel "L"-shaped spring wire blade for a drum type mower in which the horizontal leg is disposed radially outwardly beneath the enlarged disc at the lower end of the drum and the vertical leg extends upwardly and is fixedly fastened to the drum near the upper end thereof whereupon the blade may spring yield by a torsional twisting about the vertical leg when the horizontal cutting leg strikes an obstruction.

Another and still further important object of this invention is to provide a novel cutting mechanism for a drum type mower as set forth in the preceding object in which the "L"-shaped blade has an angle of slightly greater than 90° causing the horizontal leg thereof to be inclined slightly downwardly thus reducing the radial extent of the blade to a position substantially coextensive with the outer circumference of the enlarged disc when the mower is at rest and permitting that blade to be radially extended by centrifugal action beyond the outer circumference of the enlarged disc for effecting mowing when the mower is in operation.

Still another and further important object of this invention is to provide a novel cutting mechanism for a drum type mower as set forth in the preceding two objects in which there is included a radially extending elongated slot of limited length in the disc through which the vertical leg of the blade may pass and the length of the elongated slot acts to limit the radial extension of the blade by centrifugal action when the mower is operating.

A still further important object of this invention is to provide an easily replaceable spring wire blade for a drum type mower.

Another important object of this invention is to provide a novel drum type mower in which "L"-shaped spring wire blades have their vertical legs disposed closely adjacent the outer cylindrical surface of the drum, and a radially extending paddle member affixed to the outer cylindrical surface of the drum in a vertical disposition in front of each of the vertical legs, whereupon the paddles aid in the rearward windrow delivery of hay from adjacent complementary drums and to prevent the wedging of cut hay between the vertical legs and the cylindrical surface of the drum.

A further important object of this invention is to provide a relatively rigid spring wire mower blade of "L"-shape wherein the cutting portion of the wire blade constitutes only the outer end of the horizontal leg of the "L"-shaped blade, and the cutting portion being sharpened to effect a cutting in a horizontal plane.

Other and further important objects and advantages of this invention will become apparent from the disclosures in the following specification and accompanying drawings.

IN THE DRAWINGS

FIG. 3 is an enlarged vertical sectional view taken through one of the mowing drums of this invention.

FIG. 4 is a sectional view taken on the line 4—4 of FIG. 3.

GENERAL STATEMENT OF THE INVENTION

Figure 1:
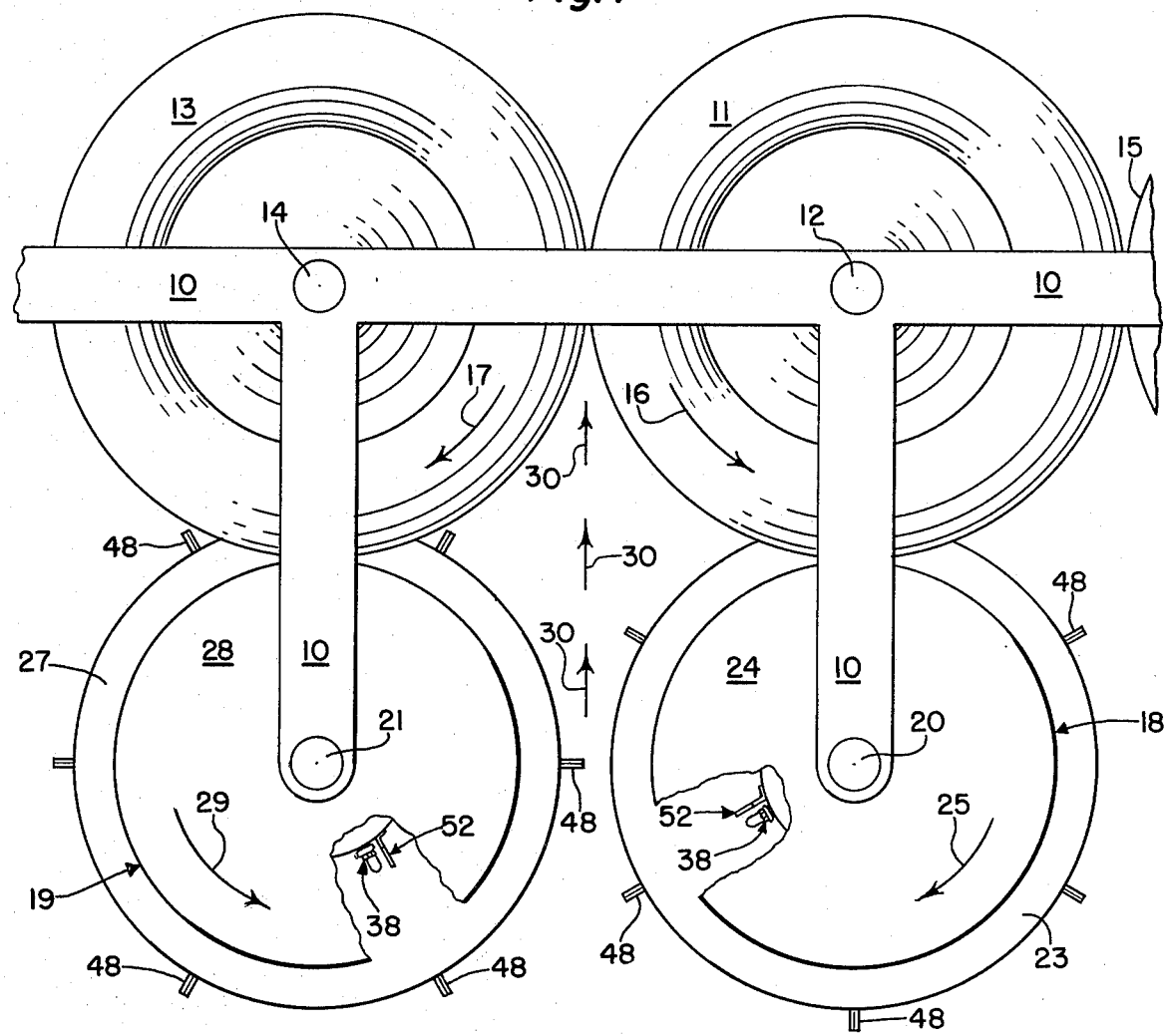
FIG. 1 is a top plan view of a portion of a drum type mower incorporating the novel spring wire blade of this invention.
Figure 2:
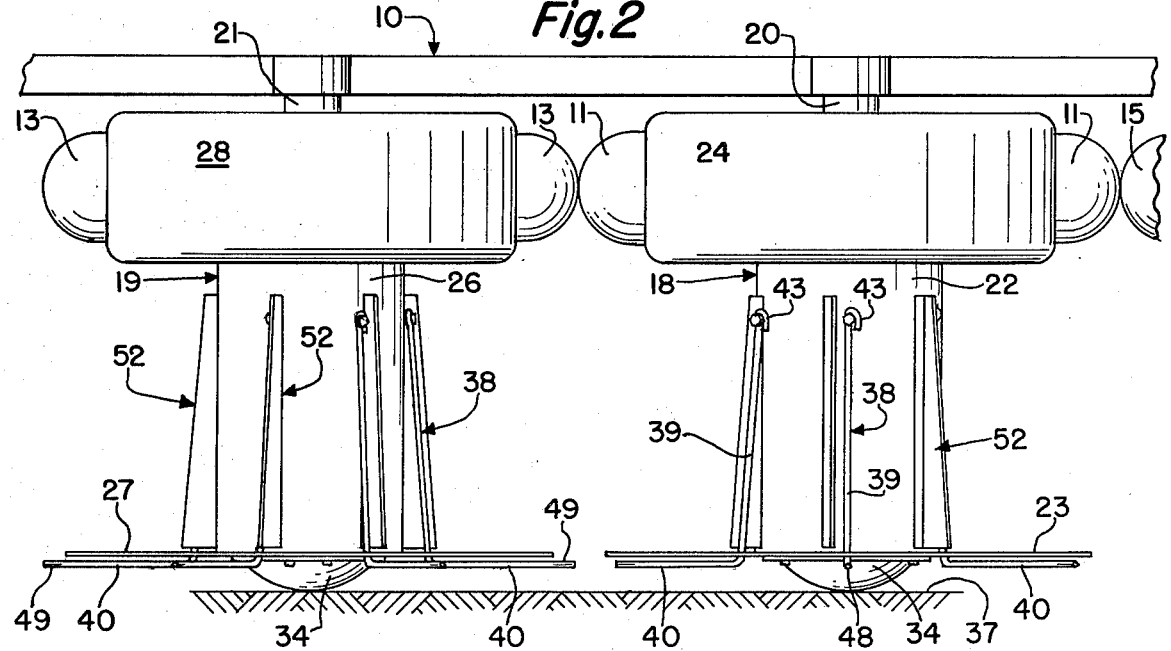
FIG. 2 is a front elevational view of the portion of the drum type mower of FIG. 1.

The subject invention is directed to the drum or rotor construction in a drum type mower such as depicted in my earlier U.S. Pat. No. 4,160,356 entitled DRIVE FOR MOWER. The drums and their rotatable driving means of the present invention are substantially the same as in my earlier patent. However, the knives of the present invention are made of a spring wire rather than the forgings previously used. The shape of the new spring wire blades and their particular mounting constitute inventive features of the subject invention. Also, in the present invention, paddles have been added to the outer cylindrical surface of the drum to perform the dual task of aiding in the feeding of harvested hay rearwardly in a windrow and to prevent the harvested hay from wedging between the spring wire blades and the drum.

AS SHOWN IN THE DRAWINGS

The reference numeral 10 indicates generally the frame structure of the mower of this invention. The mower is of the type shown in my earlier U.S. Pat. No. 4,160,356 in which the frame is carried on field traversing ground engaging wheels. The mower is equipped with a plurality of drums or rotors to effect hay and grass cutting.

A horizontally disposed pneumatic tired wheel 11 is journally carried on the frame 10 by a vertically disposed shaft 12. A cooperative horizontally disposed pneumatic tired wheel 13 has its outer circumferential surface frictionally engaged with the outer circumferential surface of the wheel 11. The wheel 13 is mounted on a vertical shaft 14 which is journally mounted on and suspended from the frame 10. These pneumatic tired wheels 11 and 13 are similar to any two of the pneumatic tired wheels shown in my earlier U.S. Pat. No. 4,160,356. It is these pneumatic tires and their frictional engagement with each other and with other wheel like members that are utilized to effect a driving of the mowing elements of this invention. A portion of another pneumatic tired wheel 15 is shown frictionally engaging the wheel 11 and is adapted to impart rotational drive thereto. An arrow 16 shows the direction of rotation of the wheel 11. Similarly an arrow 17 shows the opposite direction of rotation of the wheel 13.

A drum or rotor 18, preferably made of steel, generally defines one of the mowing units of the mower of this invention. A cooperative drum 19 functions with the drum 18 to effect the mowing of a substantial swath of hay. The drum 18 is mounted on a vertical shaft 20 which in turn is journally suspended from the frame 10. Similarly the drum 19 is mounted on a vertical shaft 21 which in turn is journally suspended from the frame 10. The drum rotor 18 comprises a centrally positioned cylindrical sleeve portion 22, a generally large diameter disc 23 which is disposed in a horizontal plane at the bottom of the sleeve portion 22, and a relatively large cylindrical wheel-like portion 24 located on top of the sleeve portion 22. The horizontally disposed wheel portion 24 is concentric with the sleeve portion 22 and as shown in FIG. 1 is in frictional engagement with the pneumatic tired wheel 11 to receive rotational drive therefrom. The drum 18 is utilized to carry cutting elements in association with the generally horizontally disposed disc 23 and thus may be designated a mowing unit. Rotational drive of the large wheel-like member 24 of the drum 18 is in the direction of the arrow 25.

Similarly the drum 19 is equipped with a cylindrical sleeve 26 at the center of its vertical disposition. Below and affixed unitarily therewith is an enlarged horizontally disposed disc 27. Above and affixed unitarily to the center sleeve 26 is an enlarged fabricated wheel 28 which is engaged frictionally by the pneumatic tired wheel 13. Drive to the drum 19 is effected in the direction of the arrow 29. Thus, as viewed in FIG. 1 the cooperative mowing unit drums 18 and 19 rotate inwardly toward each other for the cutting of hay and for effecting the discharge of the cut hay into a windrow as indicated by the path of arrows 30. The path 30 extends rearwardly from the mower as the mower traverses a hay field being harvested.

For the purpose of more clearly disclosing the invention, FIGS. 3 and 4 show enlarged views of the drum 19. It should be understood that the details of drum 18 are the same as that of drum 19 and will not be separately shown in enlarged form. A bottom closure 31 of the cylindrical sleeve portion 26 is equipped with an upturned annular flange 32 which is telescoped within the sleeve 26. An annular weld 33 fixedly joins the sleeve 26 to the flange 32 of the bottom cap 31. A ground riding convex bottom 34 is disposed beneath the enlarged horizontal disc 27. The convex bottom 34 is provided with a horizontally disposed annular flange 35. It is to this flange 35 that bolt and nut combinations 36 pass vertically through and join the convex bottom to the disc 27 and to the bottom 31. The bolts and nuts 36 are disposed at arcuately and equally spaced apart positions around the base of the drum 19. The convex bottom 34 is adapted to ride on and over the ground 37 during the mowing operation. The convex bottom thus acts as a smooth riding surface for the drum mowing elements and further acts to space the enlarged disc 27 above the ground 37 so that cutting blades associated with the disc may be located slightly above the ground.

An L-shaped spring wire blade 38 is carried on the drum 19. Although this blade is herein described in the singular there are a plurality of such blades carried on each drum to effect the mowing of hay and grasses. The spring steel wire employed is relatively rigid and thus may be preformed to a desired shape. It has limited flexibility rather than being easily flexible. The further description of the action of the blades during operation should aid in the understanding of its flexibility. The L-shaped blade 38 has a substantially vertically disposed leg 39. When the mower is at-rest the vertical leg is shown in its dash-line position in FIG. 3 which is truly vertical. The horizontal leg 40 of the L-shaped blade 38 is disposed at an angle slightly in excess of 90° to the vertical leg 39 and thus in the at-rest position of the mower the horizontal leg 40 is inclined slightly downwardly and radially outwardly under the disc 27. In the at-rest position of the mower the radial extent of the horizontal leg 40 of the L-shaped blade 38 is substantially coextensive with the outer circumference 41 of the horizontal disc 27. The disc 27 is provided with radially disposed elongated slots 42 of limited length. The slots 42 are located close to the outer surface of the cylindrical sleeve 26 of the drum 19 and are positioned at uniform arcuate spacings around the disc 27. The L-shaped blades 38 have their vertical legs 39 passing vertically through the holes or slots 42 at the lower ends thereof. When the mower is at-rest the vertical legs 39 closely abut the outer cylindrical surface of the sleeve portion 26 throughout their full lengths. The horizontal leg 40 is located beneath the disc 27 and extends radially outwardly commencing immediately below the elongated slot 42. A hook 43 is formed at the upper end of the vertical leg 39. Nuts 44 are welded as shown at 45 to the interior surface of the cylindrical sleeve 26. These nuts 44 are arcuately spaced apart in a circular path and are disposed behind holes formed in the sleeve portion 26. Bolts 46 are adapted to pass radially through the hook 43 of the L-shaped blade 38, through a spacer 47, and thence through the hole in the sleeve 26 and into the nut 44 for threaded engagement therewith. When the bolts 46 are drawn up tightly the L-shaped blades 38 are fixedly held to the drum 19. The fixed holding of the blade to the drum is located only at the upper end of the vertical leg 39. It is apparent from this construction that the blades 38 may be serviced or removed simply by loosening the bolt 46 and lifting the hook 43 from its bolt mount.

When the mower is put in operation the cooperative drums 18 and 19 are rotated causing the L-shaped blades to swing outwardly by centrifugal action about the fixed hook attachments near the top of the cylindrical sleeve portions of the drums. In the illustration of the device in FIG. 3 the vertical leg 39 swings outwardly through the extent of the elongated radial slot 42 causing the leg 39 to angle slightly outwardly into its full line position. The horizontal leg 40 moves up to a more true horizontal position as shown in the full lines of FIG. 3. The outer end 48 of the horizontal leg 40 now extends radially outwardly of the outer circumference 41 of the disc 27. This outer end portion 48 constitutes the cutting portion of the blade and is sharpened as shown at 49 for horizontal cutting.

As best shown in FIG. 4 a rock, stone or other obstruction 50 is illustrated as being struck by the cutting end 48 of one of the extended blades 38. When the rock 50 does not yield, and the drum continues to rotate, the horizontal leg 40 swings rearwardly about the vertical leg 39 as an axis. This constitutes a torsional twisting of the spring wire blade 38 within the vertical leg 39. As the cutting end 48 and its knife edges 49 fall back it pulls under the disc 27 within the confines of the disc's outer circumference 41. As soon as the outer end of the wire blade clears the rock 50 it will swing back as shown by the arrow 51 to its normal radial cutting position.

Paddles 52 are employed on the outer surfaces of the cylindrical sleeve portions 23 and 26 of the drums 18 and 19 to aid in the proper movement of the harvested hay in leaving the mower. Each paddle is provided with a first flange 53 which is welded or otherwise fastened at 54 to the sleeve 26. The flange 53 extends vertically of the sleeve 26 and is preferably slightly arcuately curved to match the cylindrical outer surface of the sleeve 26 for better attachment thereto. Each paddle is also provided with a second flange 55 which projects radially outwardly from the first flange 53. The flange 55 extends in a vertical position and is tapered downwardly and outwardly from a relatively shallow extent at 56 at the top of the paddle to a relatively deep extent 57 immediately above the disc 27. The shallow top 56 is of sufficient depth to shield the connection of the hook attachment of the wire blade to the upper end of the cylindrical sleeve 26 and the deep lower end 57 is sufficient to shield the vertical leg 39 despite the fact it is thrown outwardly the full extent of the elongated slot 42. The paddles 52 are disposed vertically on the cylindrical sleeve 26 and there is one paddle in front of each of the L-shaped spring wire blades at the position of each of the elongated slots 42. The paddles from adjacent cooperative drums such as 18 and 19 rotating inwardly toward each other cause the harvested hay to be forcibly moved from the surfaces of the discs 23 and 27 for a rearward discharge in the longitudinal arrowed path 30. Also, the paddles 52 act to shield the L-shaped spring wire blades from direct contact with the harvested hay and thereby prevents hay from accumulating and wedging between the cylindrical surface of the drums and the vertical legs of the blades. Such accumulation might tend to cause a malfunction of the mower and thus the paddles prevent such an occurrence.

OPERATION OF THE MOWER

The drums or rotors 18 and 19 of the mower of this invention are rotated at relatively high speeds by the frictional engagements of the pneumatic tired wheels with each other and with the steel fabricated wheels 24 and 28. The pneumatic tired wheel drive details are shown in my earlier U.S. Pat. No. 4,160,356. When the drums are rotating the spring wire blades have their cutting ends 48 extending radially beyond the outer circumferential edge 41 of the disc 27. When the mower traverses a field of hay to be harvested the spring wire blades of adjacent cooperative drums 18 and 19 cause the hay to be cut near the ground. The cut hay falls onto the top surfaces of the large discs 23 and 27. The rotation of these discs in the direction of the arrows 25 and 29 cause the hay to be delivered rearwardly in the arrowed path 30 between the drums 18 and 19. The paddles 52 aid in this rearward removal of the harvested hay as they grip the hay which has fallen on the surface of the discs.

The spring wire blades may be made of various diameters of wire to change the action of the mower. For example, if the field to be harvested has many rocks it might be desirable to use a lighter gauge or diameter of wire and traverse the field at a slower speed. Under these conditions the lighter gauge wire can yield more easily and be less affected by the numerous rocks. On the contrary, if the field is relatively free of rocks or other obstructions it might be desirable to use a wire of heavier gauge and traverse the field at higher speeds. Under both conditions the design of the spring wire blades and their particular embodiment in the drum type mowers of this invention act to protect the blades from the deleterious effects of rocks and the like. As shown in FIG. 4 the blades may yield rearwardly and then automatically return to operating or cutting position after clearing the rock without any manual resetting thereof. Also, for service or replacement of the blades they can be easily removed by loosening the bolts 46 and lifting the L-shaped blades by their hook ends 43.

It is the torsional spring action about the long length of the vertical legs of the blades that provides an excellent safety feature for the blades of this invention. Also, being constructed of spring wire the blades may yield or deflect without taking a fixed setting and automatically resume their original shape when the obstruction causing such deflection has been passed.

Although the L-shaped spring wire blade of this invention has been shown attached to the outside of the wall of a cylindrical sleeve portion of a mowing drum it should be understood that such an L-shaped wire blade may be successfully used in different mower environments. For example, the upper end of the vertical leg of the blade may be attached to the inside of the wall of the drum's cylindrical sleeve. In such an inside position attachment the horizontal leg of the blade may yield, upon striking an obstruction, by torsionally twisting the vertical leg in the same manner as when the blade is attached to the outside of the cylindrical sleeve. Also, the mowing rotor or drum may be shaped differently from the drum depicted in this application and yet may effectively use the blade of this invention. The L-shaped spring wire blade will function identically in its yieldability if the upper end of the vertical leg portion of that blade is attached to the rotor at a high position thereon regardless of whether or not that attachment is to a cylindrical sleeve portion. The single attachment of the wire blade at the upper end of the vertical leg permits the horizontal leg with its cutting portion to yield upon striking an obstruction, thus causing the vertical leg to be torsionally twisted. It is thus apparent that the invention of the L-shaped spring wire blade may be fully accomplished in various embodiments.

I am aware that numerous details of construction may be made throughout a wide range without departing from the principles shown herein and I do not propose limiting the patent granted hereon otherwise than as necessitated by the appended claims.

What is claimed is:

1. A mower including rotatable drums, each drum constructed with a vertically disposed cylindrical sleeve and a large diameter horizontally disposed disc at the bottom of the cylindrical sleeve, a blade comprising an L-shaped spring wire, a vertically disposed leg of the L-shaped wire disposed adjacent the wall of the cylindrical sleeve, means attaching the upper end of said vertical leg to said cylindrical sleeve, said disc having a hole therethrough closely adjacent said cylindrical sleeve to permit passage of said vertical leg, a horizontally disposed leg of the L-shaped wire adjoining the vertical leg immediately beneath the disc, said horizontal leg extending radially outwardly of the disc, said horizontal leg having a portion thereof arranged and constructed to cut hay, and whereby when said horizontal leg strikes an obstruction it may yield rearwardly by a torsional twisting of said vertical leg.

2. A device as set forth in claim 1 in which said vertical leg is on the outside of the cylindrical sleeve and said hole in said disc is of limited elongated length and extends radially outwardly from its start closely adjacent said cylindrical sleeve.

3. A device as set forth in claim 2 in which said horizontal leg joins said vertical leg at an angle slightly in excess of 90° so that the horizontal leg projects somewhat downwardly as well as radially outwardly when the vertical leg is closely adjacent the cylindrical sleeve throughout its full extent when the mower is at-rest and the drum is not rotating, whereby the portion of the horizontal leg arranged and constructed to cut hay does not extend radially beyond the outer circumference of the disc, and whereby when the drum is rotated the L-shaped spring wire blade swings outwardly by centrifugal action causing the vertical leg to move outwardly through the limited elongated length hole in the disc and the horizontal leg rises to horizontal level causing the cutting portion to extend beyond the outer circumference of said disc.

4. A device as set forth in claim 1 in which said portion of said horizontal leg arranged and constructed to cut hay being sharpened for horizontal cutting.

5. A device as set forth in claim 1 in which said means attaching the upper end of said vertical leg to said cylindrical sleeve comprises a hook formed on the upper end of said vertical leg and a bolt and nut adapted to pass through said hook and said cylindrical sleeve.

6. A device as set forth in claim 2 in which the cylindrical sleeve is provided with a radially extending paddle member positioned closely in front of each vertical leg of the L-shaped wire blade.

7. A device as set forth in claim 3 in which the cylindrical sleeve is provided with a radially extending downwardly and outwardly tapering paddle member positioned closely in front of each vertical leg of the L-shaped wire blade to shield said vertical leg from contact by hay cut by the cutting portion of the horizontal leg and deposited on the horizontally disposed disc and simultaneously to move said cut hay rearwardly of the drum.

8. A mower including a rotor having a large diameter horizontally disposed disc at its lower end, a blade comprising an L-shaped spring wire, a vertically disposed leg of the L-shaped wire disposed adjacent the rotor, means attaching the upper end of said vertical leg to a high position on said rotor, said disc having a hole therethrough to permit passage of said vertical leg, a horizontally disposed leg of the L-shaped wire adjoining the vertical leg immediately beneath the disc, said horizontal leg extending radially outwardly of the disc, said horizontal leg having a portion thereof arranged and constructed to cut hay, and whereby when said horizontal leg strikes an obstruction it may yield rearwardly by torsionally twisting said vertical leg.

9. A device as set forth in claim 8 in which said hole in the disc is radially elongated to permit the lower end of the vertically disposed leg of the L-shaped blade to swing radially outwardly by centrifugal action when the rotor is rotated to cause the horizontally disposed leg of the L-shaped blade with its cutting portion to extend radially outwardly a greater distance relative to said disc.

10. A mower including rotatable drums, each drum constructed with a vertically disposed cylindrical sleeve and a large diameter horizontally disposed disc at the bottom of the cylindrical sleeve, a blade comprising an L-shaped spring wire, a vertically disposed leg of the L-shaped wire disposed adjacent the wall of the cylindrical sleeve, means attaching the upper end of said vertical leg to said cylindrical sleeve, a horizontally disposed leg of the L-shaped wire adjoining the vertical leg adjacent the disc, said horizontal leg extending radially outwardly of the disc, said horizontal leg having a portion thereof arranged and constructed to cut hay, and whereby when said horizontal leg strikes an obstruction it may yield rearwardly by a torsional twisting of said vertical leg.

11. A mower including a rotor having a large diameter horizontally disposed disc at its lower end, a blade comprising an L-shaped spring wire, a vertically disposed leg of the L-shaped wire disposed adjacent the rotor, means attaching the upper end of said vertical leg to a high position on said rotor, a horizontally disposed leg of the L-shaped wire adjoining the vertical leg adjacent the disc, said horizontal leg extending radially outwardly of the disc, said horizontal leg having a portion thereof arranged and constructed to cut hay, and whereby when said horizontal leg strikes an obstruction it may yield rearwardly by torsionally twisting said vertical leg.

* * * * *